Dec. 28, 1965 D. WIEBE 3,225,523
CYCLONE DUST COLLECTOR FOR REMOVING PARTICLES
FROM A FLUID STREAM
Filed Nov. 21, 1961 4 Sheets-Sheet 3
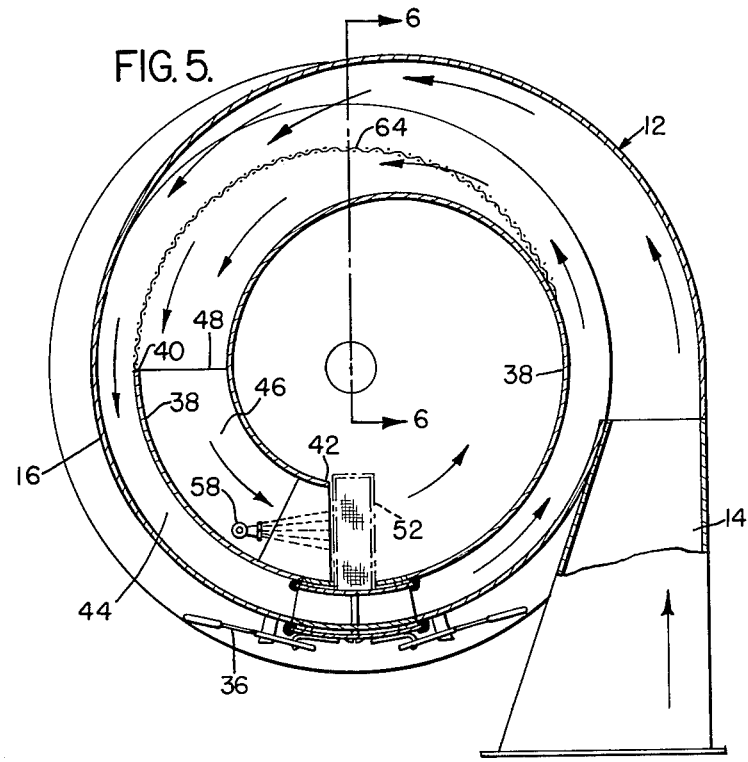
FIG. 5.
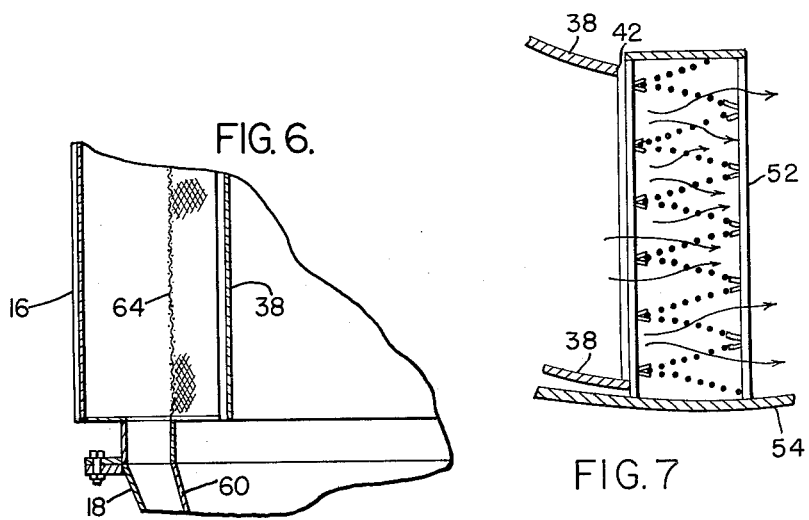
FIG. 6.
FIG. 7
INVENTOR:
DONALD WIEBE
BY Francis S. Husar
AGENT

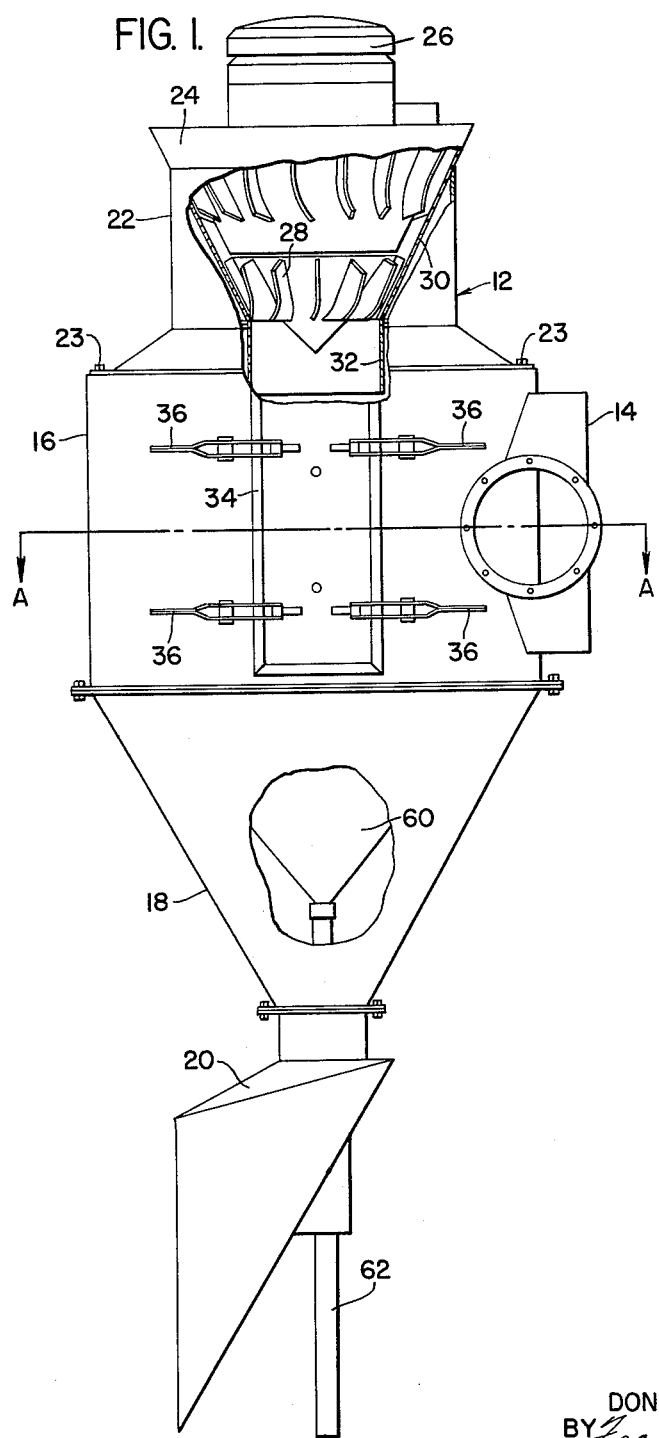

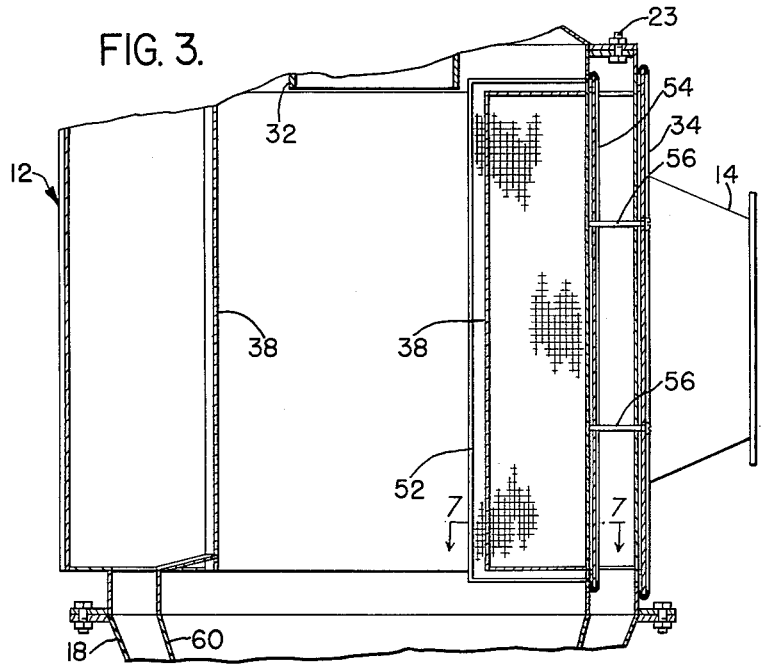
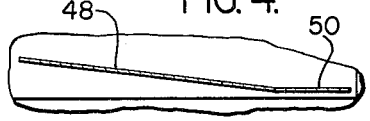
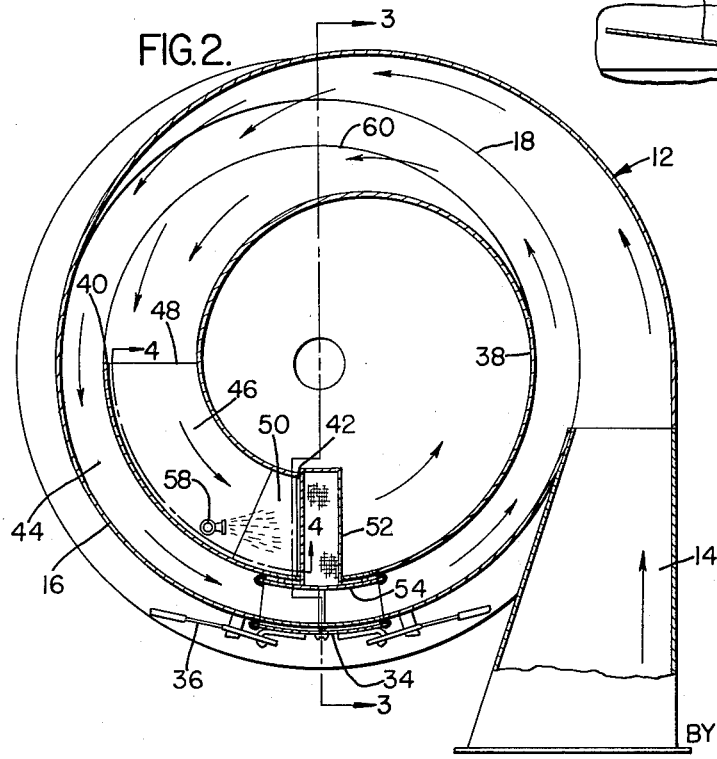
INVENTOR:
DONALD WIEBE

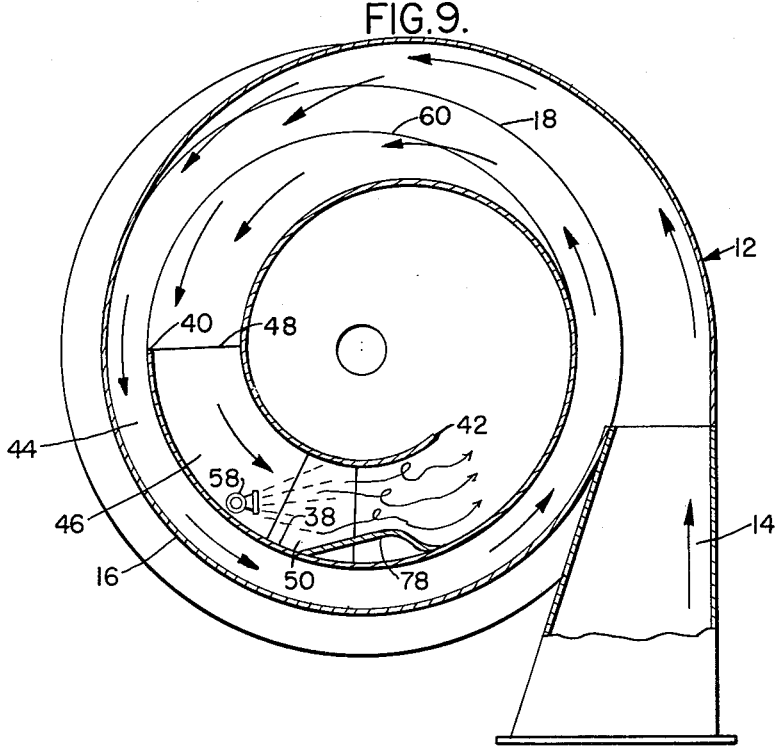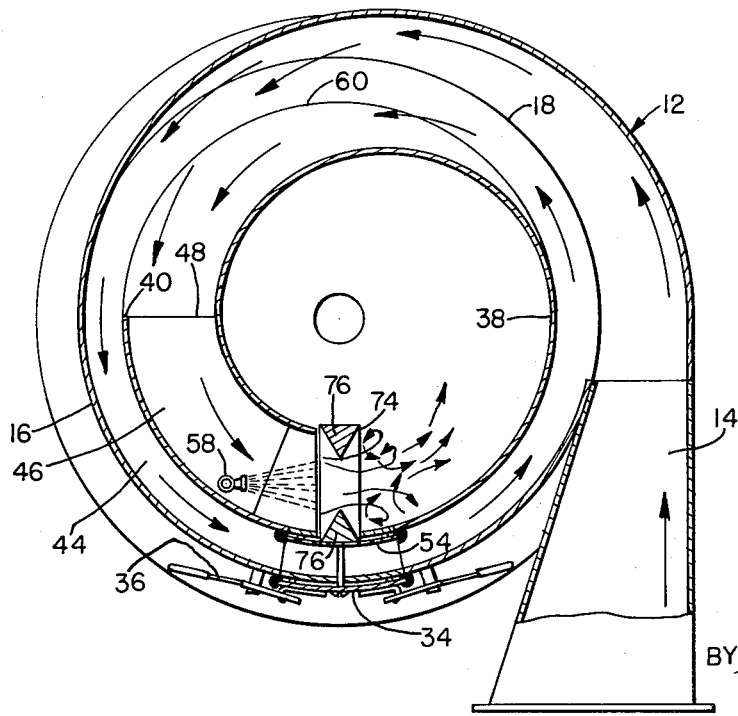

United States Patent Office 3,225,523
Patented Dec. 28, 1965

3,225,523
CYCLONE DUST COLLECTOR FOR REMOVING
PARTICLES FROM A FLUID STREAM
Donald Wiebe, Greensburg, Pa., assignor to Joy Manufacturing Company, Pittsburgh, Pa., a corporation of Pennsylvania
Filed Nov. 21, 1961, Ser. No. 153,859
10 Claims. (Cl. 55—224)

This invention relates to a separating device and more particularly to a cyclone type dust collector for removing small solid particles from a fluid stream in which they are entrained.

In the field of separating devices it has been the general practice to employ a series of devices adapted to remove, from a stream of fluid, particles of different sizes entrained therein. For example, one or more cyclone type separators are used seriatim to remove the larger particles from the stream of fluid which is then passed through other devices of a screen or bag filter type to remove the smaller particles from the stream of gases. Although such devices have served the purpose, they have not proved entirely satisfactory under all conditions of service for the reason that considerable expense has been involved in furnishing the separate cleaning facilities which must be connected by large and comparatively expensive piping and must be separately maintained and serviced. A further difficulty has been encountered in providing sufficient space for the separate devices within an industrial plant where such devices are normally employed.

The separating device of the present invention contemplates the provision of a cyclone type dust collector which provides for at least two stages of separation within a single device wherein large particles entrained in a stream of gases will be removed in one portion of the apparatus while finer particles will be both simultaneously and subsequently removed from the stream of gases within the same device. Such two stage operation within a single device is made possible by means which are provided for splitting the stream of gases into two separate parts, one of which contains all or substantially all of the larger particles entrained therein, the other of which contains only the smaller particles. That portion of the stream of gases which contains only the smaller pieces of solid material will be acted upon directly by that portion of the device designed for the removal of very small particles. Concurrently, the portion of the stream of gases which contains the large particles of solid material will be acted upon to remove such large pieces of solid material and then recycled within the device to pass through the portion of the apparatus designed to remove the smaller particles before the stream of gases is exhausted from the apparatus.

The advantages of the present invention reside in the provision of at least two stages of separation within a single separating device. These stages being a first stage directed to the separation of large particles entrained in a stream of gases, and a second stage directed to the removal of smaller particles entrained in the stream of gases. These advantages comprise: elimination of separate housings required for the series of devices formerly employed; elimination of the necessity for piping connections between the different devices; minimizing the amount of space required for the separating device; and and a higher cleaning efficiency when applied to a stream of gases containing entrained solid particles of various sizes as compared with the cleaning efficiency of any single device of the prior art, under similar circumstances.

It is therefore an object of this invention to provide a new and improved separating device.

It is another object of this invention to provide a new and improved separating device of the cyclone type for separating finely divided solid particles from a stream of fluid in which such particles are entrained.

It is a further object of this invention to provide a new and improved separating device of the cyclone type for separating finely divided particles of various sizes from the stream of fluid in which they are entrained and which provides means for separating such stream of fluid into two portions, one of which contains all or substantially all of the larger particles entrained in the stream of fluid.

Still another object of this invention is to provide a new and improved separating device of the cyclone type which provides means for dividing an incoming fluid stream, with particles entrained therein and traveling spirally within the device, so as to direct the radially outermost portion of such stream to travel in a circumferential path causing said portion to recycle circumferentially.

It is yet another object of this invention to provide a new and improved separating device of the cyclone type which provides means for dividing a fluid stream containing entrained solid particles of various sizes into two portions, one of which portions contains all or substantially all of the particles of large size, which portion of the fluid stream is first subjected to a separating action which removes the larger particles after which separation this portion of the fluid stream is recycled to remove small particles entrained therein.

It is a specific object of this invention to provide a new and improved separating device of the cyclone type in which a stream of gases, containing finely divided solid particles of various sizes, is subjected to means which split the stream of gases into two portions, one portion of which contains all or substantially all of the larger particles, the other portion of the stream of gases, containing the smaller particles of solid material entrained therein, being subjected to a water treatment in the form of a finely divided spray which increases the mass of the finely divided particles by wetting them, which increase of mass renders them readily separable from the stream of gases by cyclonic action.

It is another specific object of this invention to provide a new and improved separating device of the cyclone type which provides for separating a stream of gases, having finely divided solid particles of various sizes entrained therein, into two separate portions, one of which contains all or substantially all of the larger particles and the second portion of which containing the smaller particles shall be subjected to a water spray and an impingement screen which provide for the wetting of the particles thus increasing their mass and rendering them more readily susceptible to separation from the stream of gases by cyclonic action.

It is a further specific object of this invention to provide a new and improved separating device of the cyclone type for separating finely divided solid particles from a stream of gases in which such particles are entrained, which device provides for separating the stream of gases into two separate portions, one portion of which contains all or substantially all of the larger particles entrained in the gases and the second portion of the stream of gases containing the smaller particles originally entrained will be subjected to a venturi induced variation in velocity subsequent to a water spray addition which variation in velocity enables droplets from the water spray to wet the finely divided particles entrained in the stream of gases and by increasing the mass of these particles renders them more readily separable from the stream of gases by cyclonic action.

These and other objects and advantages of this invention will become more readily apparent upon consideration of the following description and drawings in which:

FIG. 1 is a side elevational view of a separating device of the cyclone type constructed according to the principles of this invention;

FIG. 2 is an enlarged sectional view taken substantially on line A—A of FIG. 1;

FIG. 3 is a fragmentary sectional view taken substantially on line 3—3 of FIG. 2;

FIG. 4 is a fragmentary sectional view taken substantially along the arc 4—4 of FIG. 2;

FIG. 5 is an enlarged sectional view similar to FIG. 2 showing a second embodiment of the device of FIG. 1;

FIG. 6 is a fragmentary sectional view taken substantially on line 6—6 of FIG. 5;

FIG. 7 is an enlarged sectional view taken substantially on line 7—7 of FIG. 3;

FIG. 8 is an enlarged sectional view similar to FIG. 2 showing a third embodiment of the device of FIG. 1;

FIG. 9 is a sectional view similar to FIG. 2 showing a fourth embodiment of the device of FIG. 1.

In FIG. 1 there is shown a separating device generally indicated at 12 constructed according to the principles of this invention and comprising an inlet for a stream of gases having finely divided solids of various sizes entrained therein and referred to hereinafter as the dirty gas inlet 14 and a generally cylindrical, elongated cyclone housing 16 with which the dirty gas inlet 14 tangentially communicates. The cyclone housing 16 is mounted upon and communicates with an inverted frusto-conical lower section 18 which in turn communicates at its lower extremity with a suitable hopper 20. The lower section 18 and the hopper 20 serve to collect and store, respectively, the larger particles removed from the dirty gases. The hopper 20 communicates with a suitable device (not shown) for removing the solids, collected from the stream of dirty gas, to a place of disposal. Coaxially mounted upon and removably secured to the upper surface of the cyclone housing 16 is a generally cylindrical motor support and fan housing 22, of a type well known in the art, secured to the upper portion of the cyclone housing 16 by a plurality of retaining elements such as bolts and nuts 23. Mounted within the support 22 is a suitable motor 26 and a mixed flow radial fan 28 surrounded by a suitable fan chamber 30 which communicates with a clean gas outlet 24. Communicating with the lower end of the fan chamber 30 is a hollow cylindrical downwardly extending vortex finder 32. The fan 28, the vortex finder 32 and the fan chamber 30 are of any suitable type for producing a current of air therethrough which exits through the clean gas outlet 24. The clean gas outlet 24 may be connected by conduit means to an exhaust port, chimney, or other means of gas disposal (not shown) or the clean gas outlet 24 may be left open to the surrounding atmosphere as may be desirable in some cases. The cyclone housing 16 is provided with a rectangular vertically extending opening (not shown) substantially coextensive with and covered by a removable, substantially air tight, cover 34, removably secured on the external surface of the cyclone 16 by a plurality of retaining devices 36 of a type well known in the art.

Referring now to FIG. 2 it will be seen that the dirty gas inlet 14 communicates tangentially with the cyclone housing 16 in a manner well known in the art. Within the cyclone housing 16 and axially coextensive therewith is mounted a cross sectionally scroll shaped stream splitter 38 having a vertical leading edge 40 positioned at a location spaced circumferentially counterclockwise around the cyclone housing 16 from the dirty gas inlet 14, which scroll shaped stream splitter 38 extends with increasing curvature for a total of approximately 450° around the axis of the cyclone housing 16 to terminate in a vertical trailing edge 42. The outer surface of the stream splitter 38 is substantially parallel to the inner surface of the cyclone housing 16, and radially inwardly spaced therefrom, for approximately 180° of its extent from the leading edge 40 in a counterclockwise direction. The outer surface of the steam splitter 38 and the inner surface of the cyclone housing 16 form a rectangularly cross sectional fluid conducting channel 44 which terminates at its counterclockwise extremity by blending with the dirty gas inlet 14. Approximately 90° of the outer surface of the stream splitter 38 adjacent the trailing edge 42 is overlapped by and radially spaced inwardly from the 90° portion of the stream splitter 38 immediately adjacent to the leading edge 40. These two spaced portions of the scroll surface form a rectangularly cross sectioned fluid conducting channel 46 therebetween. The lower portions of the stream splitter 38 upwardly adjacent the bottom edges are connected by, and secured to, a circumferentially extended, inclined ramp 48 which begins at the leading edge 40 and slopes downwardly in a counterclockwise direction to a flat portion 50 adjacent the trailing edge 42 (see FIG. 4). Outwardly adjacent the trailing edge 42 and parallel to and adjacent to the trailing edge of the flat surface 50 is a folded V-screen of the type disclosed in copending application No. 571,795, filed March 15, 1956, now forfeited, which application is assigned to the same assignee as the assignee of this application. The screen 52 (see FIG. 7) is substantially coextensive with the end of channel 46 and extends radially, inwardly through an opening in the outer portion of the stream splitter 38. The screen 52 is secured to a substantially air tight cover 54 which covers the opening in the stream splitter 38 and is supported and secured in position by a plurality of mounting elements 56 which are in turn secured to the cover 34 so that the retaining elements 36 secure the engagement of the cover 34 and the cover 54 with sealing elements adjacent to their respective openings and at the same time secure the positioning of the screen 52. Mounted within the channel 46 a short distance upstream from the upstream side of the screen 52 is a plurality of spray nozzles 58 suitably connected to a suitable source of water or other spray liquid and suitably positioned so that the spray from the nozzles 58 impinges upon and substantially wets the whole upstream surface of the screen 52. Secured to a lower edge of the stream splitter 38 is a hollow inverted frusto-conical collector element 60 which communicates at its lower extremity with a pipe 62 for the purpose of draining away and removing the liquid sprayed from the nozzles 58 together with particles of dust admixed with the water droplets as shall hereinafter be made more apparent.

In operation of this device the motor 26 is operated in the usual manner by supplying electric current through usual controls to begin rotation of the drivingly connected mixed flow radial fan 28. Rotation of the fan 28 causes air to move from the fan chamber 30 out through the clean gas outlet 24 in a manner well known in the art. Such fan action produces a low pressure within the vortex finder 32 and consequently within the cyclone chamber 16. As a result of such fan action, dusty air or other dirty gas from a source of such gases (not shown) will enter the dirty gas inlet 14 and circle about within the cyclone chamber 16 until, under the compulsion of pressure differences, it circles inwardly to the center of the cyclone chamber 16 and spiralling upwardly leaves the chamber 16 by way of the vortex finder 32 through the fan 28 and the fan chamber 30, out through the clean gas outlet 24. When the stream of gases enters at the tangential dirty gas inlet 14 it is constrained by the shape of the cyclone housing 16 to travel in a substantially circular path. As the dirty gas begins its circular travel through the chamber 16, solid particles entrained therein will migrate into the outer layers of the gas rotating within the chamber because of their great inertia as compared to the inertia of the gas molecules with which they are commingled. Larger particles entrained within the stream of gases will migrate more rapidly than the smaller particles into the outer layers of gas and by the time such gases have traveled 180° around the circular chamber in a counterclockwise direction as shown in FIG. 2, all or substantially all of the larger particles within the gases will be in the outer layers of the stream. When the stream of gases impinges upon the leading edge 40 of the stream splitter 38 an outer portion of the gas stream is split off and continues to travel around the chamber through the channel 44, through the space between the covers 34 and 54, and on around the channel 44 to the place where it blends in with the dirty gas inwardly adjacent the inlet 14. While the stream of gases is traveling around the chamber 16 the solid particles being of greater density than the air will be settling out of the air in a downward direction under the influence of gravity. The larger particles in the outer stream of gases will settle downwardly into the lower section 18 and from there will be gathered into the hopper 20 by gravitational action. Such particles will be removed from the hopper 20 to a place of disposal in the usual manner. It is to be noted that the larger particles excluded from the channel 46 by the action of the leading edge 40 will have no tendency to travel inwardly into the inner layers of spiralling gases and may travel several times around the chamber 16 before they settle into the collector 18 and are disposed of in a manner hereinbefore cited. When the gases in the outer layers containing the larger particles from the dirty gas stream are split off by the leading edge 40 a substantial portion of the gas will be trapped in the channel 46 where it is constrained to travel through the screen 52 so that it may exit from the chamber through the vortex finder 32. The portion of the gas which travels through the channel 46 will contain only the smaller particles originally present in the stream of gases entering through the dirty gas inlet 14. The purpose of the screen 52 is to force the gases and entrained particles to impinge upon the wetted wires of the screen 52 and in so doing to cause a commingling of the light small particles in the stream of gases with water from the wires of screen 52. The action which takes place while the gases are traveling through the screen 52 is more fully described and illustrated in the above cited copending application. When the stream of gases exits from the screen 52 the small particles of dirt commingled with droplets of water and agglomerated with one another are of sufficient size and weight to cause them to settle out into the collector element 60 and travel downwardly under the force of gravity through the collector element 60 into the pipe 62 to be carried away and disposed of in the usual manner. It is to be noted that the portion of the stream of gas which passes through the channel 44 has no way of escaping from the chamber 16 except to spiral inwardly after being relieved of its larger particles and subsequently pass through the screen 52 in the manner just described. After the gases have passed through the screen 52 and have dropped their load of admixed water droplets and dirt particles, the stream of gases spirals inwardly and upwardly and exits through the clean gas outlet 24 as before cited. It is to be further noted that the function of the stream splitter 38 is to achieve a primary separation of the entrained solid particles according to relative size so that the larger particles are collected in a cyclonic gravitational manner well known in the art. That portion of the gas stream which originally contained the larger particles is subsequently cleansed of entrained small particles by the admixing and agglomerating process associated with the screen 52 so that this portion of the gas stream which contains the large particles is subjected to a two stage cleaning process within this single device. A further function of the stream splitter 38 is to reduce the turbulence normally present in a stream of gas progressing through a cyclone separator which does not employ such splitter. It is to be further noted that the screen 52 may be removed from the device and cleaned or inverted and then replaced in the device by operation of the retaining elements 36 in a manner well known in the art. It is to be appreciated that the screen 52 is not employed for the purpose of gathering or stopping the solid particles entrained in the gas stream but that the screen 52 may become clogged by a gradual accumulation of larger particles which were not eliminated by the stream splitter 38. This build up of large particles on the screen 52 will be greatly retarded because of the existence of the stream splitter 38 with the outer channel 44 to receive and control substantially all of the larger particles admixed with the stream of gases. It is to be still further noted that any water droplets from the spray which fall to the bottom of the channel 46 will be prevented by the action of gravity from traveling clockwise along the the ramp 48 because of its counterclockwise circumferential downward slant. As long as no water travels up the ramp 48, the collection zone of the chamber 16 and the lower section 18 will be maintained in a dry condition so that the larger particles gathered therein will have no tendency to clump together and clog the hopper 20.

In FIG. 5 there is shown another embodiment of the principles of this invention in which all of the same parts hereinbefore described are used and additionally a circumferentially extended, perforated barrier or screen 64 is employed. The screen 64 begins at the leading edge 40 and extending in a clockwise direction around the chamber 16, coaxial therewith, terminates at, and is secured to, that portion of the stream splitter 38 which is nearest to the dirty gas inlet 14. The screen 64 forms a barrier between that portion of the gas stream which contains the large particles and travels through the channel 44, and the portion of the gas stream which contains only the smaller particles and travels through the channel 46. The screen 64 is axially coextensive with the stream splitter 38 and contains openings small enough to exclude the large particles found in the stream of gas but large enough to allow free passage of the gases and the smaller particles admixed therewith. The purpose of the screen 64 is to obviate the possibility of larger particles entering the channel 46 where they are likely to contribute to the clogging of the screen 52 or may possibly form a sludge in the collector element 60 and the pipe 62. Such large particles would be most likely to enter the channel 46 as a result of bouncing on the inner surface of the chamber 16 which might result in a trajectory which would carry them radially inward of the leading edge 40 with a subsequent entrainment in the gases passing through the channel 46. FIG. 6 shows the positioning of the screen 64 on the upper edge of the collecting element 60. Operation of the embodiment of FIG. 5 being otherwise the same as that of the embodiment of FIGS. 2 and 3, no further description of the operation will be necessary. It is also to be appreciated that the substantially tangential trajectory of the larger solid particles, admixed with the stream of gases, in relation to the screen 64 will prevent a build up of such particles on the outer surface of the screen 64 and will in fact constitute a scouring action on such surface to provide a self cleaning action for the screen 64 rendering it unnecessary that this screen should be cleaned at any time.

FIG. 8 illustrates a third embodiment of the principles of this invention similar in all respects to the first embodiment excepting that the screen 52 is omitted and in its place there is a venturi member 74 comprising at least two elongated, vertically extending, triangular cross sectioned elements 76. The elements 76 extend at least partially into the stream path of the gases passing through the channel 46 to cause a sudden variation in the velocity of the stream of gases passing through this part of the device. Such change in velocity is characterized by a rapid increase in velocity as the gases pass through the central portion of the venturi member 74 and a rapid decrease in velocity as the gases pass out of the venturi member 74. These changes in velocity serve the same purpose as the changes of direction of flow imposed by the screen 52 of the first embodiment. That is, the velocity variations cause the solid particles entrained in the stream of gases to commingle with the droplets of water being added to the stream of gases by the nozzles 58 and also cause the particles to impinge upon one another after being wetted. Such action results in an agglomeration or increase in particle size necessary to accomplish the rapid settling out desired in this portion of the device. The small particles thus being removed from the stream of gases, these gases then exit upwardly as hereinbefore described. The advantages of this embodiment of FIG. 8 over the first embodiment shown in FIGS. 2 and 3 reside in the ease of manufacture and low cost of the venturi member 74 as compared to the screen 52 of the first embodiment. A further advantage resides in the fact that even though a few large particles travel through the channel 46 no clogging of the venturi member 74 will take place, obviating the necessity of cleaning operations such as are sometimes necessary with the screen 52 of the first embodiment. It is to be noted that the cover members 54 and 34 shown in FIG. 8 as supporting the venturi member 74 are the same as those shown in FIG. 2 supporting the screen 52. This similarity of the two embodiments gives rise to the possibility of substituting the screen 52 for the venturi member 74 or vice versa as may be desirable under different conditions of operation such as varying particle size and varying ratio of solid content to gas flow. It is to be further noted that in the embodiment of FIG. 8 the venturi member 74 can be permanently emplaced within the stream splitter 38 and the cover members 34 and 54, together with the openings covered thereby, may be omitted from this embodiment of the invention.

FIG. 9 discloses a fourth embodiment of the separating device of this invention in which the apparatus of the first embodiment as shown in FIG. 2 is again varied by the omission of the screen 52 together with the covers 34 and 54 and their associated openings. A venturi effect is again substituted for the change of direction accomplished by the screen 52 of the embodiment of FIG. 2 and this venturi effect is accomplished by an air foil shaped, flow directing element 78 axially coextensive with the stream splitter 38 secured to the inner periphery of the outer wall of the channel 46 slightly upstream from the downstream end of such channel. The flow directing element 78 is so shaped that it causes a relatively slow increase in the speed of the gas stream and a relatively rapid decrease in such velocity to accomplish the commingling of the water droplets from the spray nozzle 58 and the solid material entrained in the gases with resulting agglomeration, increase in size and rapid settling out, as hereinbefore described. It is to be noted that the shape and positioning of the flow directing element 78 results in an outwardly directed movement of the gases toward the inner surface of the stream splitter 38. Such outward movement, coacting with the aforementioned commingling and agglomeration, aids the cleaning process by reducing the tendency of the particles to travel toward the center along with the stream of gases where they could be carried out through the vortex finder and the fan. The advantages of this embodiment over those of FIGS. 2 and 8 again reside in the simplicity and low cost of construction as well as the non-clogging advantage cited for the embodiment of FIG. 8.

Preferred embodiments of this invention having been described and illustrated, it is to be realized that modifications thereof may be made without departing from the spirit and scope of this invention. It is therefore respectfully requested that this invention be interpreted as broadly as possible and be limited only by the prior art.

What is claimed is:

1. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, means within said spiral path for introducing a liquid into such fluid stream passing therethrough, and other means within said spiral path for admixing such liquid with such foreign particles to cause commingling of such liquid and foreign particles.

2. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, means within said spiral path for introducing a liquid into such fluid stream passing therethrough, other means within said spiral path for admixing such liquid with such foreign particles to cause commingling of such liquid and such foreign particles, and elongated ramp means extending upstream from the upstream end of said admixing means within said spiral path, said ramp means being inclined circumferentially with the portion thereof immediately adjacent said admixing means being directed toward said foreign particle outlet of said shell.

3. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, and admixing means supported within said spiral path, means for introducing a liquid onto the upstream side of said admixing means, said admixing means having portions spaced in the direction of flow of such fluid stream and liquid through said spiral path which portions define openings therebetween, said portions being in overlapping relationship when viewed from a plane normal to such spiral flow path to cause impaction on said portions of substantially all of such foreign particles in such spiral flow path and intimate commingling of such foreign particles with such liquid which commingled particles and liquid subsequently pass through said openings.

4. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, admixing means located within said spiral path, means for introducing a liquid onto the upstream side of said admixing means, said admixing means having radially spaced portions extending longitudinally of said shell within said spiral path to cause an increase in velocity of a fluid stream passing therethrough and to permit the expansion of a fluid stream on the downstream side of said portion.

5. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, admixing means located between radially spaced portions of said wall means and within said spiral path, means for introducing a liquid upstream side of said admixing means, said admixing means extending longitudinally of said shell along a circumferential portion of the radially outermost one of said wall means to project into said spiral flow path.

6. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such fluid stream circumferentially into said shell, longitudinal wall means located centrally within said shell and extending between the ends thereof to define a path for such fluid stream which path is spiral in cross section within said shell, said wall means being spaced radially inwardly of said inlet, admixing means located within said spiral path, means for introducing a liquid on the upstream side of said admixing means, said admixing means having radially spaced opposed portions extending longitudinally of said shell within said spiral path, each of said portions being triangular in cross section and having an apex thereof projecting laterally into said spiral path.

7. A separating device for removing foreign particles entrained in a fluid stream comprising, a generally cylindrically hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, longitudinally extending arcuate perforated barrier means connecting the outer peripheral portions of said wall means to prevent large particles from entering such path, means within said spiral path for introducing a liquid into such fluid stream passing therethrough, and other means within said spiral flow path for admixing such liquid and such foreign particles to cause commingling of such foreign and liquid particles.

8. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream, circumferentially into said shell, longitudinal wall means located centrally within said shell and extending between the ends thereof to define a path for such fluid stream which path is spiral in cross section within said shell, said wall means being spaced radially inwardly of said inlet, longitudinally extending arcuate perforated barrier means connecting the outer peripheral portions of said wall means to prevent large foreign particles from entering such path, and admixing means supported within said spiral path, means for introducing a liquid on the upstream side of said admixing means, said admixing means having portions spaced in the direction of flow of such fluid stream and liquid which portions define openings therebetween, said portions being in overlapping relationship when viewed from a plane normal to such flow path to cause impaction on said portions of substantially all of such foreign particles in such flow path and intimate commingling of such foreign particles with such liquid which commingled particles and liquid subsequently pass through said openings.

9. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, and longitudinally extending arcuate screen member connecting the outer peripheral portions of said wall means to prevent large foreign particles from entering such path, admixing means located within said spiral path, liquid introducing means located with said spiral path for introducing a liquid into the upstream side of said admixing means, said admixing means extending longitudinally of said shell and projecting laterally into said spiral path to cause an increase in velocity of a fluid stream passing therethrough and to permit the expansion of the fluid stream on the downstream side of said admixing means.

10. A separating device for removing foreign particles entrained in a fluid stream comprising, a generally cylindrical hollow shell having a clean fluid outlet on one end thereof and a foreign particle outlet at the other end thereof, a tangential inlet communicating with the interior of said shell for directing such a fluid stream circumferentially into said shell, longitudinal wall means located centrally within said shell and extending between the ends thereof to define a path for such fluid stream which path is spiral in cross section within said shell, said wall means being spaced radially inwardly of said inlet, and longitudinally extending perforated barrier means connecting the outer peripheral portions of said wall means to prevent large foreign particles from entering such path, means within said spiral path for introducing a liquid into such fluid stream passing therethrough, and other means within said spiral path for admixing such liquid with such foreign particles to cause commingling of such liquid in such foreign particles, an elongated ramp means extending upstream from the upstream end of said admixing means within said spiral path, said ramp means being inclined circumferentially with the portion thereof immediately adjacent said admixing means being directed toward said foreign particle outlet of said shell.

(References on following page)

References Cited by the Examiner

UNITED STATES PATENTS

| | | | |
|---|---|---|---|
| 2,067,422 | 1/1937 | Severson | 55—459 |
| 2,076,988 | 4/1937 | Garrett | 55—459 |
| 2,432,757 | 12/1947 | Weniger | 55—459 |
| 2,523,614 | 9/1950 | Elverum | 55—459 |
| 2,545,537 | 3/1951 | Addison | 55—235 |
| 2,719,631 | 10/1955 | Vicard | 55—459 |
| 3,034,647 | 5/1962 | Giesse | 209—144 |
| 3,054,244 | 9/1962 | Hersh | 55—239 |

FOREIGN PATENTS

| | | |
|---|---|---|
| 624,309 | 7/1961 | Canada. |
| 20,825 | 1/1946 | Finland. |
| 869,177 | 10/1941 | France. |
| 513,834 | 7/1961 | Great Britain. |

HARRY B. THORNTON, *Primary Examiner.*

HERBERT L. MARTIN, *Examiner.*